US010924626B2

(12) United States Patent
Tsuchiya

(10) Patent No.: US 10,924,626 B2
(45) Date of Patent: Feb. 16, 2021

(54) IMAGE FORMING APPARATUS AND LOG INFORMATION ACQUISITION SYSTEM

(71) Applicant: TOSHIBA TEC KABUSHIKI KAISHA, Tokyo (JP)

(72) Inventor: Hiroteru Tsuchiya, Numazu Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/505,965

(22) Filed: Jul. 9, 2019

(65) Prior Publication Data

US 2020/0162631 A1 May 21, 2020

(30) Foreign Application Priority Data

Nov. 21, 2018 (JP) .............................. JP2018-218378

(51) Int. Cl.
*H04N 1/32* (2006.01)
*H04N 1/00* (2006.01)
*H04N 1/327* (2006.01)

(52) U.S. Cl.
CPC ..... *H04N 1/32101* (2013.01); *H04N 1/00344* (2013.01); *H04N 1/00938* (2013.01); *H04N 1/32523* (2013.01); *H04N 1/32771* (2013.01); *H04N 2201/0094* (2013.01)

(58) Field of Classification Search
None
See application file for complete search history.

(56) References Cited

U.S. PATENT DOCUMENTS

| 2004/0252324 | A1* | 12/2004 | Ohta | G06F 11/008 |
| | | | | 358/1.14 |
| 2006/0045544 | A1* | 3/2006 | Kim | G06Q 10/10 |
| | | | | 399/8 |
| 2011/0185220 | A1 | 7/2011 | Foley et al. | |
| 2011/0286035 | A1 | 11/2011 | Uruma | |

(Continued)

FOREIGN PATENT DOCUMENTS

| JP | 4625412 B2 | 2/2011 |
| JP | 2014-078126 A | 5/2014 |

OTHER PUBLICATIONS

Extended European Search Report Issued in corresponding European Patent Application No. 19191201.3 dated Mar. 11, 2020.

*Primary Examiner* — Frantz Bataille
(74) *Attorney, Agent, or Firm* — Foley & Lardner LLP

(57) ABSTRACT

An image forming apparatus includes a communication processor, an external communication processor, and an approval processor. The communication processor is configured to communicate with a plurality of devices. Each of the plurality of devices is capable of generating an image forming job and configured to execute at least one software program. The external communication processor is configured to communicate with a management server. The approval processor is configured to approve transmission of log information relating to a target software program among the at least one software program. The target software program is executed by a target device among the plurality of devices in response to the target device receiving a request to transmit the log information for the target software program. The request is received by the target device from the management server.

11 Claims, 6 Drawing Sheets

(56) References Cited

U.S. PATENT DOCUMENTS

| | | |
|---|---|---|
| 2012/0188599 A1 | 7/2012 | Kyono |
| 2016/0054964 A1* | 2/2016 | Takagi .................. G06F 3/1203 |
| | | 358/1.15 |
| 2017/0060614 A1 | 3/2017 | Yoshinari et al. |
| 2017/0091062 A1 | 3/2017 | Nishikawa |
| 2018/0167259 A1* | 6/2018 | Kurahashi ............. G06F 3/1203 |

* cited by examiner

FIG.2

| PROGRAM A |
|---|
| PROGRAM B |
| ⋮ |
| PROGRAM m |

| OUTPUT PROGRAM IDENTIFIER (PROGRAM A-n) | OUTPUT FLAG (ON) | APPROVAL FLAG (ON) |
|---|---|---|
| OUTPUT PROGRAM IDENTIFIER (PROGRAM C-2) | OUTPUT FLAG (OFF) | APPROVAL FLAG (OFF) |

| MFP IDENTIFIER (IP-k) | OUTPUT PROGRAM IDENTIFIER | OUTPUT FLAG | APPROVAL FLAG |
|---|---|---|---|
| MFP IDENTIFIER (IP-k) | OUTPUT PROGRAM IDENTIFIER | OUTPUT FLAG | APPROVAL FLAG |

⋮

IMAGE FORMING APPARATUS AND LOG INFORMATION ACQUISITION SYSTEM

CROSS-REFERENCE TO RELATED APPLICATION

This application is based upon and claims the benefit of priority from Japanese Patent Application No. 2018-218378, filed Nov. 21, 2018, the entire contents of which are incorporated herein by reference.

FIELD

Embodiments described herein relate generally to an image forming apparatus and a log information acquisition system.

BACKGROUND

When an unexpected error occurs in a software program or the like executed by a device, log information at the time the error occurs is acquired to analyze the reason that caused the error. This acquisition may be called a cause investigation.

However, if a location of the device in which the error occurs is remote from a cause analyst, much cost and time and labor are taken to acquire actual log information, and the actual log information is not easily acquired. Therefore, a system is developed to collect the log information from a remote location via a network without directly visiting the location. In this case, since the log information may contain confidential information, it is necessary to ensure security of the log information.

For example, Japanese Patent No. 4625412 (hereinafter, referred to as Japanese Patent No. 4625412) discloses a system in which a log collection server is provided between an apparatus and a management server that stores log information. The log collection server acquires log information and authentication information from the device in which the error occurs, requests the management server to perform the authentication processing using this authentication information, and does not transmit the log information to the management server if correctness is not authenticated.

In such a system, it is necessary to issue the authentication information in advance from the management server to each device that executes a software program to be managed.

DESCRIPTION OF THE DRAWINGS

FIG. 2 is a diagram illustrating a plurality of software programs stored in a non-volatile memory (NVM) of a personal computer (PC) in the log information acquisition system according to the embodiment;

FIG. 3 is a diagram illustrating an example of a management table stored in an NVM of an image forming apparatus in the log information acquisition system according to the embodiment;

FIG. 4 is a diagram illustrating an example of a management table stored in an NVM of a management server in the log information acquisition system according to the embodiment;

DETAILED DESCRIPTION

In accordance with an embodiment, an image forming apparatus comprises a communication module configured to communicate with a plurality of devices, each of the plurality of devices being capable of generating an image forming job and optionally executing at least one software program; an external communication module configured to communicate with a management server on an external network; an approval module configured to approve transmission of log information relating to a specific software program to be executed by a specific device among the plurality of devices in response to a request to transmit the log information for the specific software program from the management server.

Hereinafter, embodiments are described with reference to the accompanying drawings.

Figure 1:
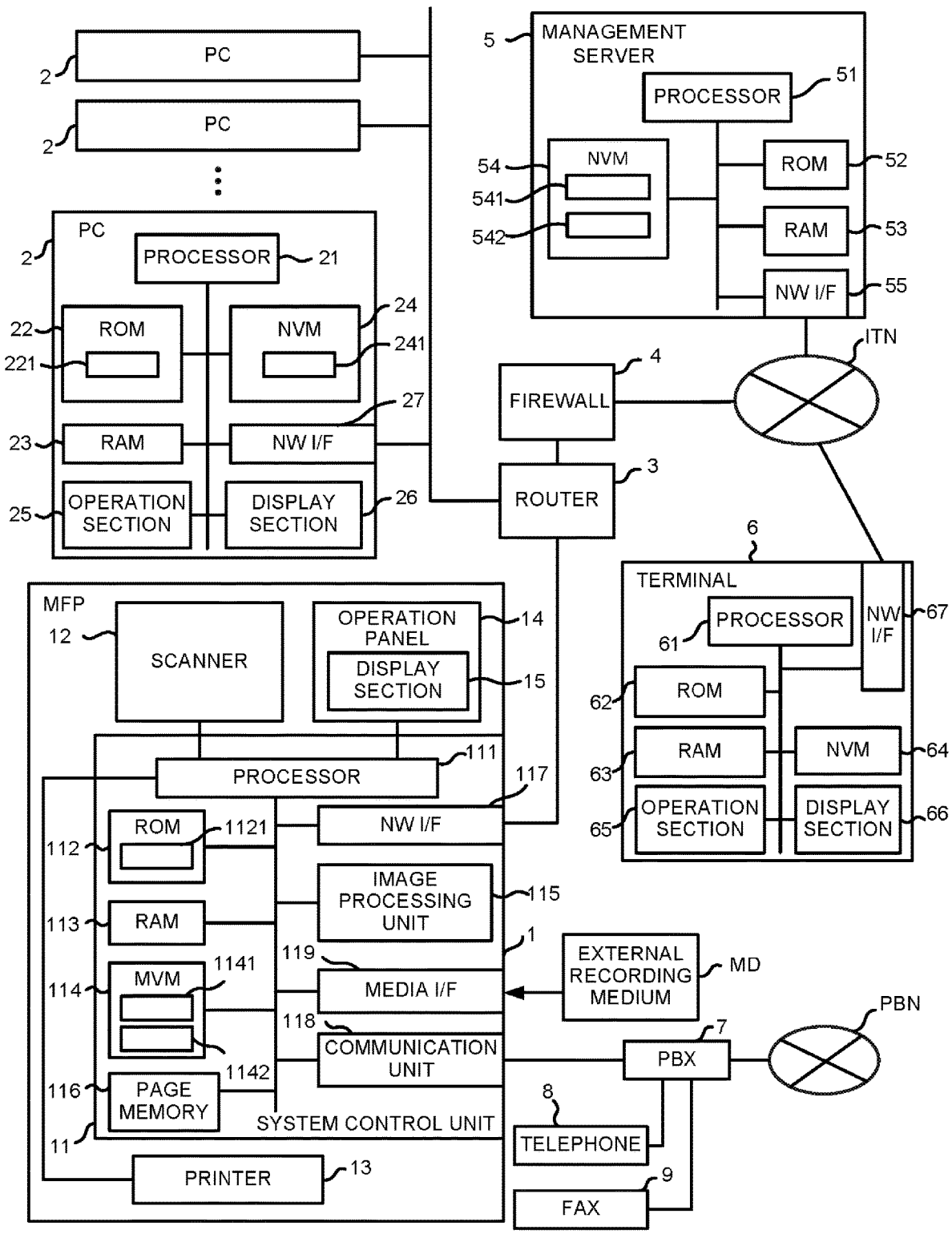
FIG. 1 is a block diagram illustrating an example of a log information acquisition system according to an embodiment.

FIG. 1 is a block diagram illustrating an example of configurations of a log information acquisition system according to the embodiment.

The log information acquisition system includes an MFP 1 serving as an image forming apparatus according to the embodiment, and a plurality of PCs 2 serving as user devices connected to the MFP 1. The MFP 1 is connected to the plurality of PCs 2 on a local area network connected via a router 3. The MFP 1 is connected to an external network INT such as the Internet via a firewall 4 connected to the router 3. The MFP 1 can access an external device (for example, a Web server) via the external network INT (for example, the Internet) to be capable of using a function (for example, a Web service) provided by the external device. The MFP 1 has a function of being connected to the public line network PBN. In the example of the configuration shown in FIG. 1, the MFP 1 is connected to a Private Branch Exchange (PBX) 7 connecting a FAX 9 and a telephone 8. The MFP 1 is connected to the public line network PBN via the PBX 7.

The log information acquisition system includes a management server 5 and a terminal 6 connected to the external network INT (such as the Internet). The management server 5 stores log information of software programs to be executed on the PC 2. The terminal 6 is a PC or the like used by a cause analyst who analyzes the cause of a problem occurring in the software program executed on the PC 2 based on the log information.

The management server 5 and the terminal 6 are disposed far away from the MFP 1 and the PC 2.

The PC 2 is a general computer used by a user. The PC 2 performs data communication with the other devices connected via the router 3 on the local area network. The PC 2 can be connected to the external network INT through the firewall 4 connected to the router 3 if permitted through the designation by an administrator on an administrator terminal which is one of the PCs 2. The PC 2 includes a processor 21, a read only memory (ROM) 22, a random access memory (RAM) 23, an NVM 24, an operation section 25, a display section 26 and a network interface (NW I/F) 27.

The processor 21 is, for example, a central processing unit (CPU). The processor 21 performs various processing functions by executing a control program 221 stored in the ROM 22 or the NVM 24. The ROM 22 stores control programs and control data for controlling the operation of the PC 2. The RAM 23 is a main memory that functions as a working memory.

The NVM 24 is a rewritable non-volatile storage device such as a solid state drive (SSD) or a hard disk drive (HDD). The NVM 24 stores software programs and data for performing various processing functions. FIG. 2 is a diagram illustrating a plurality of (m) software programs (including software program A, software program B, software program m) 241 stored in the NVM 24.

The operation section 25 is an input device such as a keyboard or a pointing device such as a touch pad. The display section 26 is a liquid crystal display or the like. The operation section 25 and the display section 26 may be configured separately from the PC 2 and connected to the PC 2. The NW I/F 27 is used for performing data communication with the other devices on the local area network via the router 3.

The terminal 6 is a general computer operated by a cause analyst in an operating company of a software program 241. Accordingly, the terminal 6 has the same configuration as the PC 2 except that the terminal 6 is operated by the cause analyst instead of the user. Specifically, the terminal 6 includes a processor 61, a ROM 62, a RAM 63, an NVM 64, an operation section 65, a display section 66 and an NW I/F 67.

The NVM 64 stores a program for enabling the management server 5 to collect log information for a specific PC 2 or for a specific software program of a specific PC 2 and a program to be used for analyzing the cause from collected log information as control programs. The NW I/F 67 is directly connected to the external network INT to perform data communication with the management server 5.

The MFP 1 has a scanner function, a printer function, a copy function, a network communication function, a facsimile communication function, and the like. The MFP 1 can be connected to networks having various configurations. Various settings corresponding to a use mode by the user can be made for the MFP 1.

The MFP 1 restricts a specific function according to contents of setting and selects a data processing method. For example, settings relating to security such as printing restriction setting for each department or each user, encryption strength for each device, setting for deletion of overwrite, blocking of a network port, etc. can be designated by the administrator using the MFP 1 or the administrator terminal which is one of the PCs 2. Specifically, in the administrator terminal, information (Web application information) relating to functions of the external device connected to the MFP 1 via the external network INT, which can be executed through a button operation on the MFP 1 can be set. The administrator terminal stores the function of the external apparatus which can be used by the MFP 1 as the Web application information through an operation performed by the administrator. For example, in the administrator terminal, an access address (such as a uniform resource locator (URL)) address) to an external device such as the management server 5 or a name of the function of the external device (e.g., a name of the web service, a name of the web application, etc.) is input by the administrator. The administrator terminal can transmit the Web application information to the MFP 1 and enable the MFP 1 to store the Web application information.

As shown in FIG. 1, the MFP 1 includes a system control unit 11, a scanner 12, a printer 13 and an operation panel 14 (display section 15). The system control unit 11 collectively controls each section of the MFP 1. The system control unit 11 is connected to the scanner 12, the printer 13 and the operation panel 14 (display section 15). For example, the system control unit 11 controls the scanner 12 or the printer 13 according to an operation instruction input from the operation panel 14 or the PC 2. The system control unit 11 acquires setting information input via the operation panel 14 or a PC 2 designated as the administrator terminal.

The scanner 12 converts an image on a surface of a document to image data. For example, the scanner 12 reads an image on the surface of the document as color image data or monochrome image data by optically scanning the surface of the document. The scanner 12 has a scanning mechanism, a photoelectric conversion unit, and a document feeder (ADF).

The printer 13 forms an image on a sheet which is an image receiving medium. For example, the printer 13 forms a color image or a monochrome image on the sheet. The printer 13 may form an image using a printing system such as an electrophotographic system, an inkjet system, or a thermal transfer system.

The operation panel 14 is a user interface. The operation panel 14 has, for example, various operation buttons such as a numeric button, a start button, a copy button, a scanning button and a FAX button, and a display section 15 with a built-in touch panel.

The operation panel 14 functions as both an operation section through which the user inputs an operation instruction and a display section for displaying guidance to the user.

For example, the operation panel 14 is not only used to instruct execution of a processing but also used by the administrator to input information relating to settings for the MFP 1. On the display section 15, for example, an operation screen (menu screen) that can be operated by the user through touch operation to instruct the execution of the processing is displayed. The operation screen includes various objects such as an execution button, a mark, characters, a symbol, an icon, and the like.

The system control unit 11 includes a processor 111, a ROM 112, a RAM 113, an NVM 114, an image processing unit 115, a page memory 116, an NW I/F 117, a communication unit 118 and a media I/F 119.

The processor 111 is, for example, a CPU. The processor 111 performs various processing functions by executing control programs stored in the ROM 112 or the NVM 114.

The ROM 112 stores control programs and control data for controlling the operation of the MFP 1. The control programs include a program 1121 for managing collection of the log information from each PC 2.

The RAM 113 is a main memory that functions as a working memory.

The NVM 114 is a rewritable non-volatile storage device such as an SSD or an HDD.

The NVM 114 stores control programs and control data for performing various processing functions. The NVM 114 has a storage area for storing information (i.e., device setting information) indicating device settings of the MFP 1 at present. The device settings relate to basic operations of the MFP 1. The device settings are made separately from settings (processing settings) for individual jobs (e.g., copy, scan, print, etc.) to be executed. The device settings are, for example, relate to functions to be performed by the MFP 1 such as security setting or operation restriction.

FIG. 3 is a diagram illustrating a management table 1141 that stores information relating to the device settings and is stored in the NVM 114. The management table 1141 includes management information relating to the software program 241 in the PC 2 requested by the management server 5 to collect the log information as described later in detail. Specifically, an output program identifier for specifying the software program 241, an output flag, and an approval flag are set for each software program 241 in the PC 2.

The output program identifier uniquely identifies the software program 241 and the PC 2 storing the software program 241. For example, the output program identifier may be a combination of a program name or an execution file name of the software program 241 with a management number or an Internet Protocol (IP) address of the PC 2. In FIG. 3, the program name and the management number are indicated simply by A-n or C-2.

The output flag indicates whether or not the collected log information is permitted to be output to the management server 5. If ON is set in the output flag, the log information is permitted to be output. If OFF is set in the output flag, the log information is prevented from being output.

The approval flag indicates whether or not collection of the log information is approved.

The collection of the log information is approved if ON is set in the approval flag, and if OFF is set in the approval flag, the collection is not approved.

The NVM 114 has a log storage portion 1142 for storing log information collected by the PC 2.

The image processing unit 115 processes image data read by the scanner 12 or image data received via the network. The page memory 116 has a storage area for copying or decompressing image data of at least one page. The image data to be printed is transferred from the page memory 116 to the NVM 114 and then stored in the NVM 114.

The NW I/F 117 is used for performing data communication with the other devices on the local area network via the router 3. The communication unit 118 is used for performing facsimile communication using the public line network PBN via the PBX 7.

The media I/F 119 is directly (locally) connected to an external storage medium MD such as a memory device or a memory card.

The management server 5 is operated by a management company that is independent of the operation company. The management server 5 includes a processor 51, a ROM 52, a RAM 53, an NVM 54, an NW I/F 55, and the like. The NVM 54 stores a program that instructs collection of the log information relating to a specific PC 2 or for a specific software program of a specific PC as control programs in response to a request from the terminal 6. The NW I/F 55 is directly connected to the external network INT to perform data communication with the MFP 1 and the terminal 6. When the PC 2 is permitted to be connected to the external network INT, data communication with the PC 2 can be performed.

FIG. 4 is a diagram illustrating an example of the management table 541 stored in the NVM 54 of the management server 5. Similar to the management table 1141 in the MFP 1 shown in FIG. 3, the management table 541 includes an output program identifier for specifying the software program 241, an output flag and an approval flag for each software program 241 in the PC 2 for which the log information is required to be collected. The management table 541 further includes an MFP identifier for specifying the MFP 1 connected to the PC 2 for each software program 241 in the PC 2 for which the log information is required to be collected. The MFP identifier may be, for example, an IP address of the MFP 1. In FIG. 4, the IP address is simply indicated by IP-K or the like. Thus, the management table 541 stores management information of each software program 241 in the PC 2 for which the log information is required to be collected.

The NVM 54 has a log storage portion 542 for storing the log information collected by the PC 2.

Next, the operation of each component of the log information acquisition system in the present embodiment is described.

Figure 5:
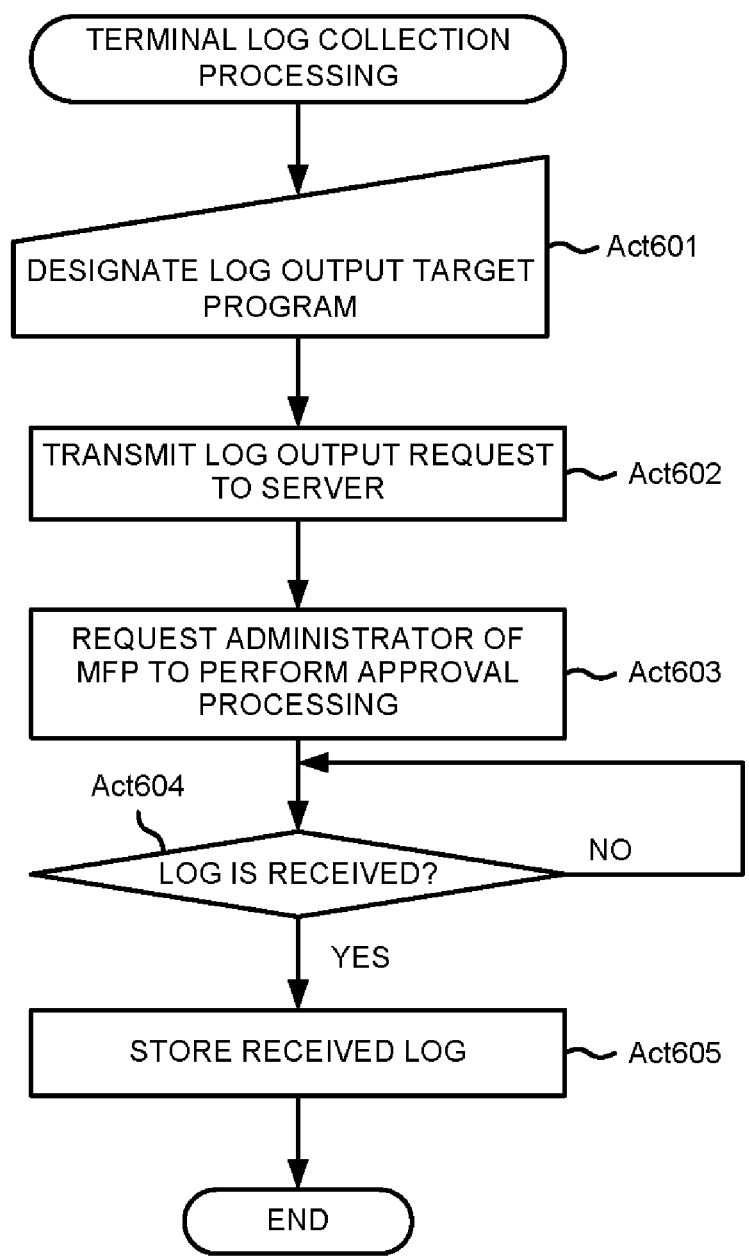
FIG. 5 is a flowchart depicting an example of a terminal log collection processing executed by a processor of a terminal in the log information acquisition system according to the embodiment.

FIG. 5 is a flowchart depicting an example of a terminal log collection processing executed by the processor 61 of the terminal 6. The processing shown in the flowchart is executed when the cause analyst who is notified by the user of the PC 2 or the administrator of the PC 2 that an error occurs in the software program 241 in the PC 2 operates the operation section 65 to instruct to execute a program, wherein the program is stored in the ROM 62 or the NVM 64 to instruct the management server 5 to collect the log information. Specifically, in response to a predetermined operation on the operation section 65, the processor 61 starts the processing shown in FIG. 5 according to the program.

The processor 61 first receives designation on a log output target program through the operation section 65 (Act 601). The designation is performed by the cause analyst who operates the terminal 6 operating the operation section 65 to input the an output program identifier for specifying the software program 241 in the PC 2 in which the problem occurs which is notified by the user or administrator of the PC 2. Then, the processor 61 transmits a log output request to the management server 5 via the external network INT using the NW I/F 67 (Act 602). The log output request includes the output program identifier for specifying the designated log output target program in the PC 2 and an MFP identifier for specifying the MFP 1 connected to the PC 2.

The processor 61 requests an administrator who manages the MFP 1 connected to the PC 2 in which the problem occurs to perform an approval processing by email using the NW I/F 67 via the external network INT, for example (Act 603). The administrator who manages the MFP 1 may be the same as or different from the administrator of the PC 2 who notifies the occurrence of an error. The approval request may not be automatically made by the processor 61, but may be made by displaying a telephone number of the administrator on the display section 66 or displaying a message for instructing contact to the cause analyst. Based on the display, the cause analyst can call the administrator to make the approval request.

Thereafter, the processor 61 stands by until the log information is transmitted from the management server 5 via the external network INT, i.e., until the log information is received (Act 604).

Figure 6:
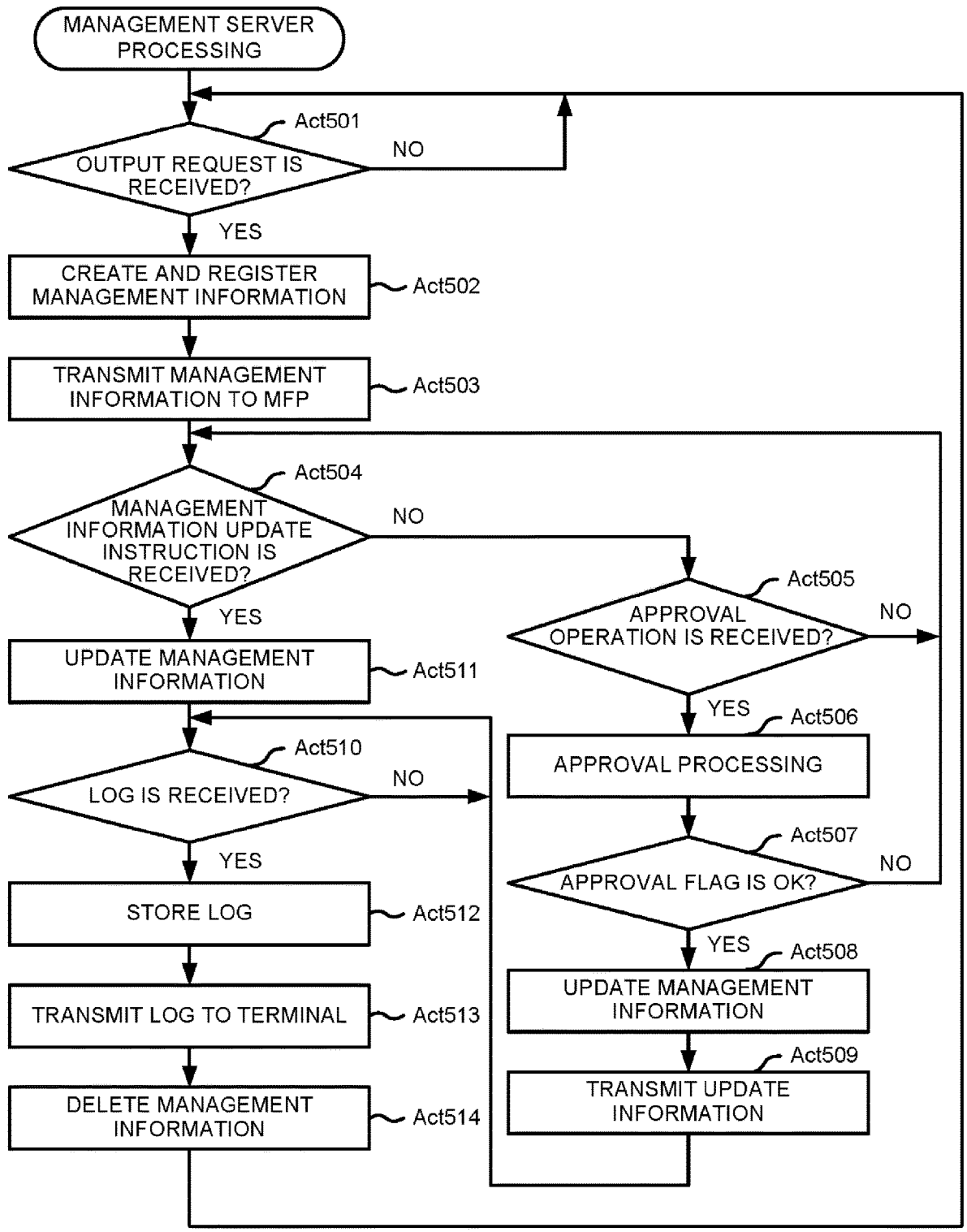
FIG. 6 is a flowchart depicting an example of a management server processing executed by a processor of the management server in the log information acquisition system according to the embodiment.

FIG. 6 is a flowchart depicting an example of a management server processing that is constantly executed by the processor 51 of the management server 5. Specifically, when a power supply of the management server 5 is turned on, the processor 51 starts the processing shown in FIG. 6 according to the control program stored in the ROM 52 or the NVM 54.

The processor 51 stands by until the log output request is received by the NW I/F 55 from the terminal 6 via the external network INT (Act 501). If it is determined that the log output request is received (Yes in Act 501), the processor 51 creates the management information based on the output program identifier and the MFP identifier included in the log output request, and registers the created management information in the management table 541 stored in the NVM 54 (Act 502). In this case, OFF is set in both the output flag and the approval flag of the management information. Next, the processor 51 transmits the management information to the MFP 1 via the external network INT using the NW I/F 55 (Act 503). Specifically, the processor 51 transmits the output program identifier, the output flag and the approval flag without the MFP identifier among the management information registered in the management table 541 stored in the NVM 54 to the MFP 1 identified by the MFP identifier.

Thereafter, the processor 51 determines whether or not a management information update instruction (described below) transmitted from the MFP 1 via the external network INT is received by the NW I/F 55 (Act 504). If it is determined that the management information update instruction is not received (No in Act 504), the processor 51 determines whether or not an approval operation is received by the NW I/F 55 via the external network INT from the cause analyst or the PC 2 operated by the administrator of the MFP 1 who receives the approval request from the terminal 6 (Act 505). For example, it is possible to log in to the management server 5 with an Internet browser operating on a general-purpose computer such as the PC 2 operated by the administrator, and to perform the operation of approving output of the log information by inputting a password or the like. If it is determined that the approval operation is not received (No in Act 505), the processor 51 returns to the processing in Act 504 described above. Thus, the processor 51 stands by until the management information update instruction or the approval operation is received.

Figure 7:
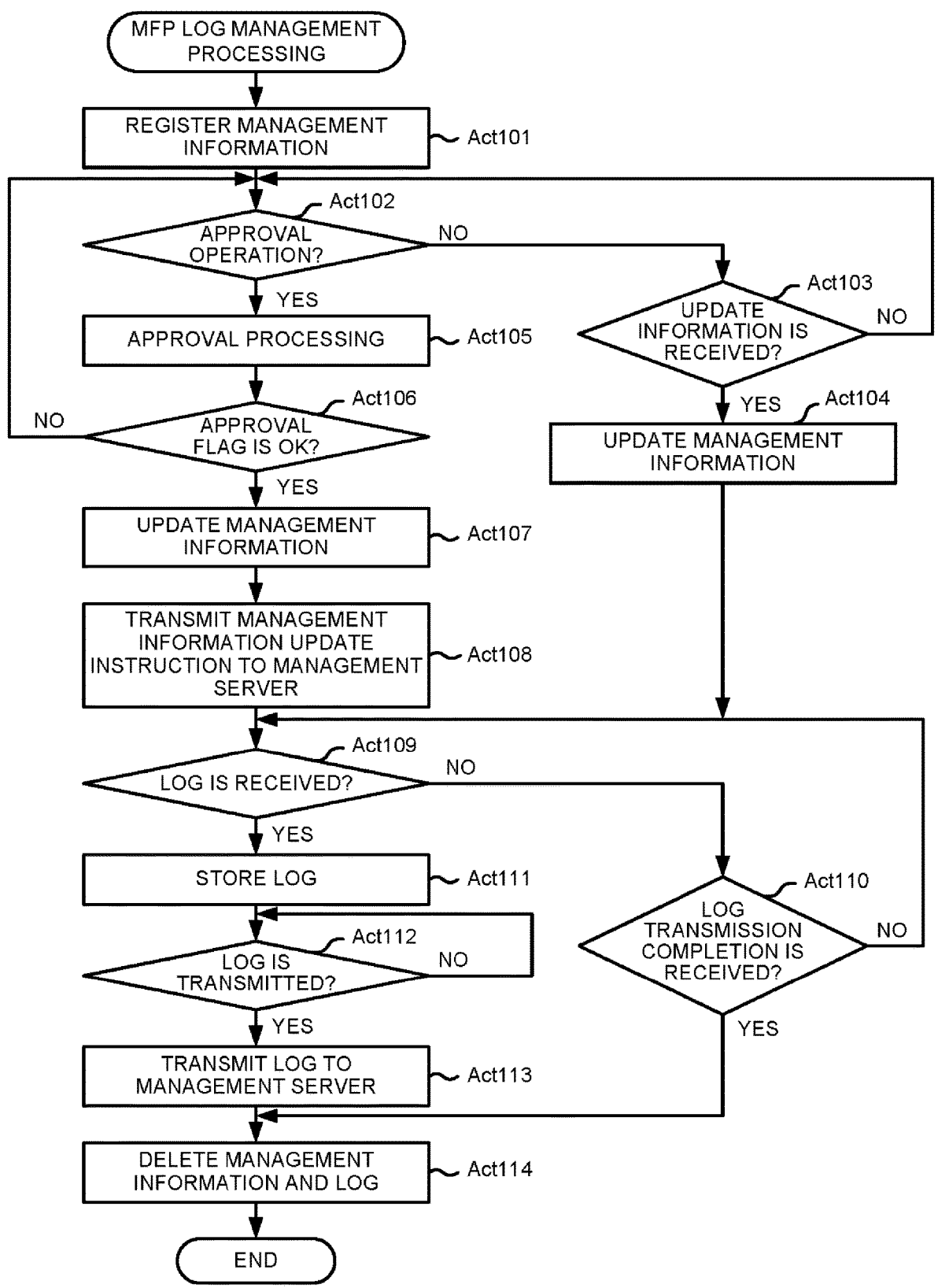
FIG. 7 is a flowchart depicting an example of an multi-function peripheral (MFP) log management processing executed by a processor of the image forming apparatus according to the embodiment.

FIG. 7 is a flowchart depicting an example of the MFP log management processing executed by the processor 111 of the MFP 1. When the processor 111 detects that the management information is received by the NW I/F 117, the processor 111 starts a processing shown in the flowchart according to the program 1121 stored in the ROM 112 or the NVM 114.

The processor 111 registers the received management information in the management table 1141 stored in the NVM 114 (Act 101). Thereafter, the processor 111 determines whether or not a predetermined approval operation is performed by the cause analyst or the administrator of the MFP 1 who receives the approval request from the terminal 6 (Act 102). The predetermined approval operation is, for example, an operation in which the administrator operates the operation panel 14 to input the approval information.

Alternatively, the predetermined approval operation may be an operation in which the administrator operates the PC 2 to transmit the approval information to the MFP 1. If it is determined in Act 102 that the predetermined approval operation is not performed (No in Act 102), the processor 111 determines whether or not update information of the management information is received by the NW I/F 117 from the management server 5 via the external network INT (Act 103). If it is determined that the update information of the management information is not received from the management server 5 (No in Act 103), the processor 111 returns to the processing in Act 102.

As shown in FIG. 6, if it is determined that the approval operation is received from the PC 2 operated by the administrator of the MFP 1 in Act 505 (Yes in Act 505), the processor 51 of the management server 5 executes the approval processing in response to the approval operation from the PC 2 operated by the administrator of the MFP 1 (Act 506). Then, the processor 51 determines whether or not the approval is made as a result of the approval processing (Act 507). If it is determined that the approval is not made (No in Act 507), the processor 51 returns to the processing in Act 504 described above.

If it is determined in Act 507 that the approval is made (Yes in Act 507), the processor 51 updates the corresponding management information registered in the management table 541 stored in the NVM 54 (Act 508). Specifically, both the output flag and the approval flag in the management information are set to ON. Next, the processor 51 transmits the update information indicating update contents of the management information to the MFP 1 via the external network INT by the NW I/F 55 (Act 509).

Specifically, the processor 51 instructs the MFP 1 to update the management information registered in the management table 1141 stored in the NVM 114 of the MFP 1 in the same manner as in Act 508. Thereafter, the processor 51 stands by until the log information is transmitted from the MFP 1 (or the PC 2) via the external network INT, i.e., until the log information is received by the NW I/F 55 (Act 510).

As shown in FIG. 7, if it is determined that the update information indicating the update contents of the management information is received from the management server 5 in Act 103 (Yes in Act 103), the processor 111 of the MFP 1 updates the management information registered in the management table 1141 stored in the NVM 114 based on the received update information (Act 104). In the management information that is received from the management server 5 and registered in the management table 1141 stored in the NVM 114 in Act 101, the output flag and the approval flag are set to OFF.

In Act 104, the processor 111 sets both the output flag and the approval flag to ON. In this way, collection of the log information for the target software program 241 in the PC 2 is approved. Thereafter, the processor 111 proceeds to the processing in Act 109 described later.

If it is determined in Act 102 that the predetermined approval operation is performed (Yes in Act 102), the processor 111 executes the approval processing in response to the approval operation (Act 105). Then, the processor 111 determines whether or not the approval is made as a result of the approval processing (Act 106). If it is determined that the approval is not made (NO in Act 106), the processor 111 returns to the processing in Act 102 described above.

If it is determined in Act 106 that the approval is made (Yes in Act 106), the processor 111 updates contents registered in the management table 1141 stored in the NVM 114 (Act 107). In the management information that is received from the management server 5 and registered in the management table 1141 stored in the NVM 114 in Act 101, the output flag and the approval flag are set to OFF. In Act 107, the processor 111 sets the output flag and the approval flag to ON. As a result, collection of the log information for the target software program 241 in the PC 2 is approved.

Thereafter, the processor 111 transmits a management information update instruction to the management server 5 via the external network INT using the NW I/F 117 (Act 108).

Specifically, the processor 111 instructs the management server 5 to update the corresponding management information registered in the management table 541 stored in the NVM 54 of the management server 5 in the same manner as in Act 107.

As shown in FIG. 6, if it is determined that the management information update instruction from the MFP 1 is received in Act 504 (Yes in Act 504), the processor 51 of the management server 5 updates the corresponding management information registered in the management table 541 stored in the NVM 54 in response to the update instruction (Act 511). Specifically, both the output flag and the approval flag in the management information are set to ON.

As shown in FIG. 7, after both the output flag and the approval flag in the management information are set to ON in Act 104 or the Act 107, the processor 111 of the MFP 1 stands by until the log information or log transmission completion information is received from the PC 2. Specifically, the processor 111 first determines whether or not the log information transmitted from the PC 2 is received by the NW I/F 117 (Act 109).

If it is determined that the log information is not received (No in Act 109), the processor 111 determines whether or not the log transmission completion information transmitted from the PC 2 is received by the NW I/F 117 (Act 110). If it is determined that the log transmission completion information is not received (No in Act 110), the processor 111 returns to the processing in Act 109 described above.

Figure 8:
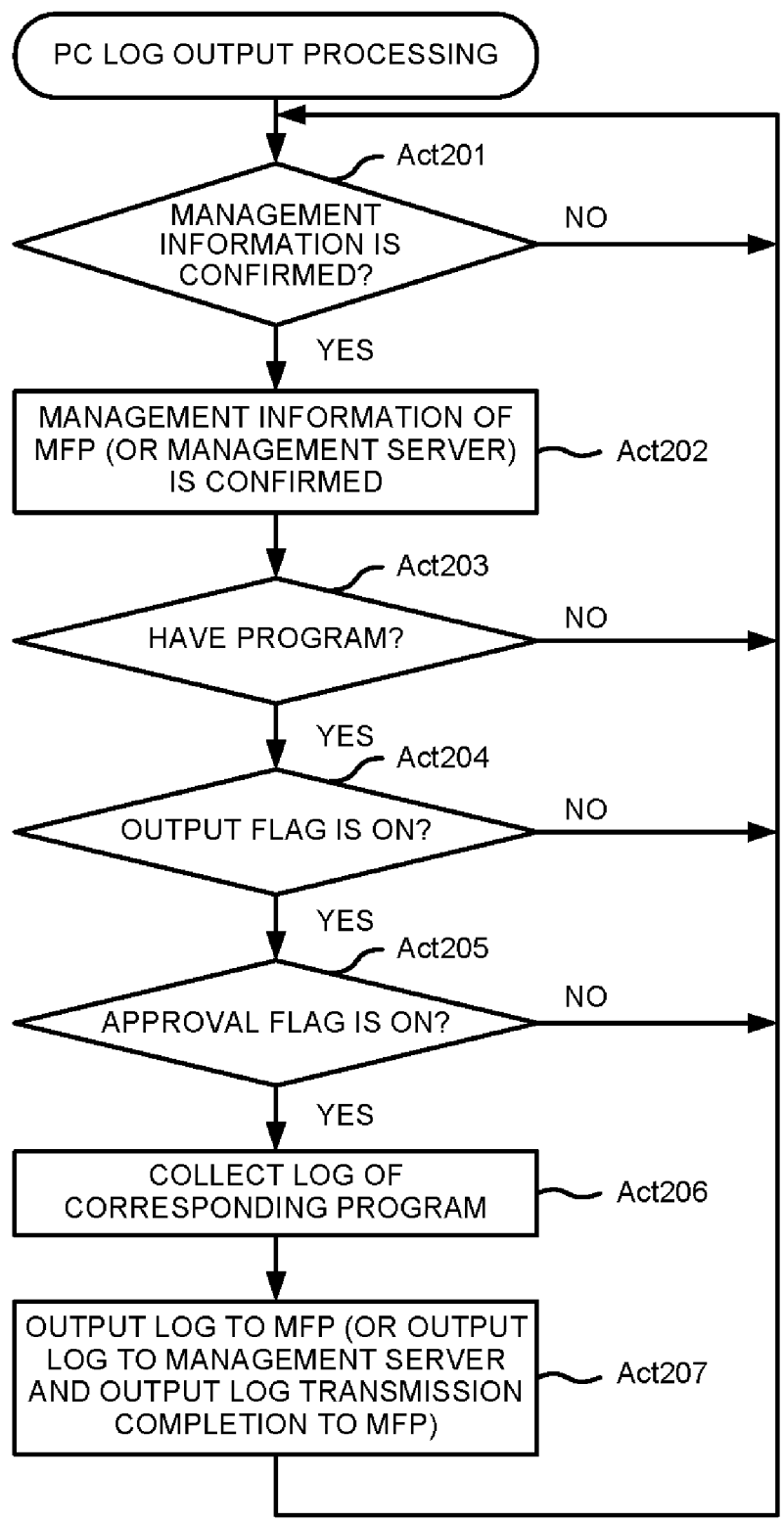
FIG. 8 is a flowchart depicting an example of a PC log output processing executed by a processor of the PC in the log information acquisition system according to the embodiment.

FIG. 8 is a flowchart depicting an example of a PC log output processing constantly executed by the processor 21 of the PC 2. Specifically, when a power supply of the PC 2 is turned on, the processor 21 starts a processing shown in the flowchart according to the control program 221 stored in the ROM 22 or the NVM 24.

The processor 21 determines whether the output of the log information for the corresponding PC 2 registered in the management table 1141 stored in the NVM 114 of the MFP 1 is required at a constant time interval, and collects and outputs the log information if the output is required.

Therefore, the processor 21 first stands by until it is a timing to confirm the management information (Act 201). Then, if it is determined that it is the timing to confirm the management information (Yes in Act 201), the processor 21 confirms whether or not the management information relating to the PC 2 is present in the management table 1141 stored in the NVM 114 of the MFP 1 (Act 202). If the PC 2 is permitted to be directly connected to the management server 5 via the external network INT, the management table 541 stored in the NVM 54 of the management server 5 may be confirmed instead of the management table 1141 stored in the NVM 114 of the MFP 1.

The processor 21 determines whether or not the management information relating to the PC 2, i.e., the output program identifier corresponding to the PC is present in the management table 1141 stored in the NVM 114 of the MFP 1 (or the management table 541 stored in the NVM 54 of the management server 5) (Act 203). If it is determined that there is no such output program identifier (NO in Act 203), the processor 21 returns to the processing in Act 201 described above.

On the other hand, if it is determined that the output program identifier corresponding to the PC is present (Yes in Act 203), the processor 21 determines whether or not the output flag in the management information is ON (Act 204). If it is determined that the output flag is OFF (NO in Act 204), the processor 21 returns to the processing in Act 201 described above.

If it is determined that the output flag is ON (Yes in Act 204), the processor 21 determines whether or not the approval flag in the management information is ON (Act 205). If it is determined that the approval flag is OFF (No in Act 205), the processor 21 returns to the processing in Act 201 described above.

On the other hand, if it is determined that the approval flag is ON (Yes in Act 205), the processor 21 collects the log information for the software program 241 identified by the output program identifier in the management information (Act 206). Then, the processor 21 outputs the collected log information to the MFP 1 (Act 207). The log information can be transmitted in the same format as an image forming job (printing job) that the PC 2 transmits to the MFP 1. If the PC 2 is permitted to be directly connected to the management server 5 via the external network INT, the log information may be output to the management server 5 instead of the MFP 1 in Act 207 described above. At this time, the processor 21 outputs the log transmission completion information indicating that the log information is transmitted directly to the management server 5 to the MFP 1.

Thereafter, the processor 21 returns to the processing in Act 201.

As shown in FIG. 7, the processor 111 of the MFP 1 stands by until the log information in Act 109 or the log transmission completion information in Act 110 is received. If it is determined that the log information from the PC 2 is received (Yes in Act 109), the processor 111 stores the received log information in the log storage portion 1142 of the NVM 114 (Act 111). Thereafter, the processor 111 waits for transmission timing of the log information (Act 112). The transmission timing may be a timing immediately after Act 111 described above, or may be a predetermined timing. If it is determined that the transmission timing of the log information arrives (Yes in Act 112), the processor 111 transmits the log information stored in the log storage portion 1142 of the NVM 114 using the NW I/F 117 via the external network INT to the management server 5 (Act 113). After the transmission is terminated, the processor 111 deletes the corresponding management information in the management table 1141 of the NVM 114 and the log information stored in the log storage portion 1142 (Act 114). Then, the processor 111 terminates the MFP log management processing.

In Act 110 described above, if it is determined that the log transmission completion information is received from the PC 2 (Yes in Act 110), the processor 111 proceeds to the processing in Act 114, and deletes the corresponding management information in the management table 1141 stored in the NVM 114.

As shown in FIG. 6, if it is determined that the log information from the MFP 1 (or the PC 2) is received in Act 510 (Yes in Act 510), the processor 51 of the management server 5 stores the received log information in the log storage portion 542 of the NVM 54 (Act 512). Thereafter, the processor 51 transmits the stored log information using the NW I/F 55 via the external network INT to the terminal 6 (Act 513). After the transmission is terminated, the processor 51 deletes the corresponding management information in the management table 541 stored in the NVM 54 and the log information stored in the log storage portion 542 (Act 514). Then, the processor 51 returns to the processing in Act 501 described above.

As shown in FIG. 5, if it is determined that the log information is received from the management server 5 via the external network INT by the NW I/F 67 (Yes in Act 604), the processor 61 of the terminal 6 stores the received log information in the NVM 64 (Act 605). Then, the processor 61 terminates the terminal log collection processing. Thereafter, the cause analyst executes a program used to analyze the cause from the collected log information with the terminal 6 to analyze the cause of an error occurring in the software program 241 in the PC 2 from the log information stored in the NVM 64.

Next, the operations of the MFP 1 and the management server 5 are described for each operation case.

Operation Case 1

In this operation case 1, the administrator operates the operation panel 14 of the MFP 1 or the administrator operates the PC 2 to transmit the approval information to the MFP 1 to perform the approval operation, and since the PC 2 in which the error occurs is not permitted to be connected to the external network INT, the log information cannot be directly transmitted from the PC 2 to the management server 5.

In the operation case 1, if the log output request is received from the terminal 6 in Act 501, the processor 51 of the management server 5 creates the management information and registers the created management information in the management table 541 in Act 502. In this case, both the output flag and the approval flag of the management information are set to OFF. Next, the processor 51 transmits the management information to the MFP 1 in Act 503. Thereafter, the processor 51 stands by until the management information update instruction in Act 504 or the approval operation in Act 505 is received.

If the management information from the management server 5 is received, the processor 111 of the MFP 1 registers the received management information in the management table 1141 in Act 101. Thereafter, the processor 111 stands by until the approval operation is performed in Act 102 or the update information is received from the management server 5 in Act 103. Then, if a predetermined approval operation is performed by the cause analyst or the administrator who receives the approval request from the terminal 6, the processor 111 proceeds to the processing in Act 105 from Act 102 to perform the approval processing in response to the approval operation. If it is determined in Act 106 that the approval is made, the processor 11 updates the contents registered in the management table 1141 in Act 107. Specifically, both the output flag and the approval flag in the management information registered in the management table 1141 are set to ON. Thereafter, in Act 108, the processor 111 instructs the management server 5 to update the corresponding management information registered in the management table 541 in the management server 5 in the same manner as in Act 107 described above.

Accordingly, the processor 51 of the management server 5 determines that the management information update instruction from the MFP 1 is received in Act 504 described above, and updates the corresponding management information registered in the management table 541 according to the update instruction in Act 511. Specifically, both the output flag and the approval flag in the management information are set to ON.

Thereafter, the processor 51 stands by until the log information is received in Act 510.

After transmitting the management information update instruction to the management server 5 in Act 108, the processor 111 of the MFP 1 stands by until the log information in Act 109 or log transmission completion information in Act 110 from the PC 2 is received. Then, if the log information from the PC 2 is received, the processor 111 proceeds to the processing in Act 111 from Act 109 to store the received log information in the log storage portion 1142, and then waits for transmission timing of the log information in Act 112. If the transmission timing of the log information arrives, the processor 111 transmits the log information stored in the log storage portion 1142 to the management server 5 in Act 113. After the transmission is terminated, in Act 114, the processor 111 deletes the corresponding management information in the management table 1141 and the log information stored in the log storage portion 1142, and then terminates the MFP log management processing.

If the log information from the MFP 1 is received, the processor 51 of the management server 5 proceeds to the processing in Act 512 from Act 510 to store the received log information in the log storage portion 542. Thereafter, the processor 51 transmits the stored log information to the terminal 6 in Act 513. Then, in Act 514, the processor 51 deletes the corresponding management information in the management table 541 and the log information stored in the log storage portion 542, and then returns to the processing in Act 501.

By doing this, the administrator operates the operation panel 14 of the MFP 1 or the administrator operates the PC 2 to transmit the approval information to the MFP 1 to perform the approval operation, and in this way, the log information for the PC 2 in which the error occurs can be transmitted to the management server 5 via the MFP 1 connected to the external network INT.

Operation Case 2

In the operation case 2, the administrator operates the operation panel 14 of the MFP 1 or the administrator operates the PC 2 to transmit the approval information to the MFP 1 to perform the approval operation, and since the PC 2 in which the error occurs is permitted to be connected to the external network INT, the log information can be transmitted directly to the management server 5 from the PC 2.

In this operation case 2, the processor 51 of the management server 5 transmits the management information to the MFP 1 in Act 503 as with the above operation case 1, and thereafter, stands by until the management information update instruction in Act 504 or the approval operation in Act 505 is received.

The processor 111 of the MFP 1 also registers the management information received from the management server 5 in the management table 1141 in Act 101 as with the above operation case 1, and thereafter, stands by until the approval operation is performed in Act 102 or the update information from the management server 5 is received in Act 103. Then, if the predetermined approval operation is performed by the administrator, the processor 111 executes the approval processing in response to the approval operation in Act 105, and if the approval is made in Act 106, the processor 111 updates the contents registered in the management table 1141 in Act 107. Thereafter, the processor 111 instructs the management server 5 to update the management information in Act 108.

Accordingly, the processor 51 of the management server 5 determines that the management information update instruction from the MFP 1 is received in Act 504, and then updates the corresponding management information registered in the management table 541 in response to the update instruction in Act 511. Specifically, both the output flag and the approval flag in the management information are set to ON. Thereafter, the processor 51 stands by until log information is received in Act 510.

In the operation case 2, the PC 2 can transmit the log information to the management server 5 directly.

If the log information from the PC 2 is received, the processor 51 of the management server 5 proceeds to processing in Act 512 from Act 510 to store the received log information in the log storage portion 542. Thereafter, the processor 51 transmits the stored log information to the terminal 6 in Act 513. Then, in Act 514, the processor 51 deletes the corresponding management information in the management table 541 and the log information stored in the log storage portion 542, and then returns to the processing in Act 501.

After transmitting the management information update instruction to the management server 5 in Act 108 described above, the processor 111 of the MFP 1 stands by until the log information from the PC 2 is received in Act 109 or the log transmission completion information from the PC 2 is received in Act 110. Then, if the log transmission completion information from the PC 2 is received, the processor 111 proceeds to the processing in Act 114 from Act 110 to delete the corresponding management information in the management table 1141 and the log information stored in the log storage portion 1142, and then terminates the MFP log management processing.

By doing this, the administrator operates the operation panel 14 of the MFP 1 or the administrator operates the PC 2 to transmit the approval information to the MFP 1 to perform the approval operation, and in this way, the log information from the PC 2, which is connected to the external network INT and in which the error occurs, can be transmitted to the management server 5.

Operation Case 3

In the operation case 3, the administrator operates the PC 2 to transmit the approval information to the management server 5 to perform the approval operation, and since the PC 2 in which the error occurs is prevent from being connected to the external network INT, the log information cannot be transmitted to the management server 5 from the PC 2.

In this operation case 3, the processor 51 of the management server 5 transmits the management information to the MFP 1 in Act 503 as with the above operation case 1, and thereafter, stands by until the management information update instruction in Act 504 or the approval operation in Act 505 is received.

The processor 111 of the MFP 1 also registers the management information received from the management server 5 in the management table 1141 in Act 101, and thereafter, stands by until the approval operation is performed in Act 102 or the update information from the management server 5 is received in Act 103. The operations untill now are the same as those in the above operation case 1.

In the operation case 3, the approval operation on the management server 5 is performed by the PC 2 operated by the administrator. Specifically, if the approval operation from the PC 2 operated by the administrator of the MFP 1 is received, the processor 51 of the management server 5 proceeds to the processing in Act 506 from Act 505 to execute the approval processing in response to the approval operation performed by the PC 2 operated by the administrator. Then, if it is determined that the approval is made in Act 507, the processor 51 updates the corresponding management information registered in the management table 541 in Act 508. Specifically, both the output flag and the approval flag in the management information are set to ON. Next, in Act 509, the processor 51 transmits the update information indicating update contents of the management information to the MFP 1. Specifically, the processor 51 instructs the MFP 1 to update the management information registered in the management table 1141 stored in the NVM 114 of the MFP 1 in the same manner as in Act 508 described above.

If the update information of the management information is received from the management server 5 in Act 103, the processor 111 of the MFP 1 proceeds to the processing in Act 104, and updates the management information registered in the management table 1141 based on the received update information. In the management information registered in Act 101, both the output flag and the approval flag are set to OFF. In Act 104, the processor 111 sets both the output flag and the approval flag to ON.

In this way, the collection of the log information for the target software program 241 of the PC 2 is approved. Thereafter, the processor 111 stands by until the log information from the PC 2 is received in Act 109 or the log transmission completion information from the PC 2 is received in Act 110. Then, if the log information from the PC 2 is received, the processor 111 stores the received log information in the log storage portion 1142 in Act 111 as with the above operation case 1. Thereafter, if the transmission timing of the log information arrives in Act 112, the processor 111 transmits the log information stored in the log storage portion 1142 to the management server 5 in Act 113. After the transmission is terminated, in Act 114, the processor 111 deletes the corresponding management information in the management table 1141 and the log information stored in the log storage portion 1142, and then terminates the MFP log management processing.

If the update management information is transmitted to the MFP 1 in Act 509 described above, the processor 51 of management server 5 stands by until the log information is received from the MFP 1 (or the PC 2) in Act 510. If the log information from the MFP 1 is received, the processor 51 stores the received log information in the log storage portion 542 in Act 512 as with the above operation case 1. Thereafter, the processor 51 transmits the stored log information to the terminal 6 in Act 513. Then, in Act 514, the processor 51 deletes the corresponding management information in the management table 541 and the log information stored in the log storage portion 542, and then returns to the processing in Act 501.

By doing this, the administrator operates the PC 2 to transmit the approval information to the management server 5 to perform the approval operation, and in this way, the log information for the PC 2 in which the error occurs can be transmitted to the management server 5 via the MFP 1 connected to the external network INT.

Operation Case 4

In the operation case 4, the administrator operates the PC 2 and transmits the approval information to the management server 5 to perform the approval operation, and since the PC 2 in which the error occurs is permitted to be connected to the external network INT, the log information can be directly transmitted to the management server 5 from the PC 2.

In this operation case 4, the processor 51 of the management server 5 transmits the management information to the MFP 1 in Act 503 as with the above operation case 3, and thereafter, stands by until the management information update instruction in Act 504 or the approval operation in Act 505 is received.

The processor 111 of the MFP 1 also registers the management information received from the management server 5 in the management table 1141 in Act 101, and thereafter, stands by until the approval operation is performed in Act 102 or the update information from the management server 5 is received in Act 103, as with the above operation case 3.

Then, if the PC 2 operated by the administrator performs the approval operation on the management server 5, the processor 51 of the management server 5 proceeds to the processing in Act 506 from Act 505 to execute the approval processing in response to the approval operation performed by the PC 2 operated by the administrator as with the above operation case 3. Then, if it is determined that the approval is made in Act 507, the processor 51 updates corresponding management information registered in the management table 541 in Act 508. Specifically, both the output flag and the approval flag in the management information are set to ON. Next, in Act 509, the processor 51 transmits the update information indicating update contents of the management information to the MFP 1. Thereafter, the processor 51 stands by until the log information is received in Act 510.

As with the operation case 3 described above, if the update information of the management information is received from the management server 5, the processor 111 of the MFP 1 proceeds to the processing in Act 104 from Act 103 to update the management information registered in the management table 1141 based on the received update information. Specifically, both the output flag and the approval flag are set to ON. Thereafter, the processor 111 stands by until the log information from the PC 2 is received in Act 109 or the log transmission completion information from the PC 2 is received in Act 110.

In the operation case 4, as with the operation case 3 described above, the PC 2 can directly transmit the log information to the management server 5.

If the log information from the PC 2 is received, the processor 51 of the management server 5 proceeds to the processing in Act 512 from Act 510 to store the received log information in the log storage portion 542. Thereafter, the processor 51 transmits the stored log information to the terminal 6 in Act 513. Then, in Act 514, the processor 51 deletes the corresponding management information in the management table 541 and the log information stored in the log storage portion 542, and then returns to the processing in Act 501.

After transmitting the management information update instruction to the management server 5 in Act 108 described above, the processor 111 of the MFP 1 stands by until the log information from the PC 2 is received in Act 109 or the log transmission completion information from the PC 2 is received in Act 110. Then, if the log transmission completion information from the PC 2 is received, the processor 111 proceeds to the processing in Act 114 from Act 110 to delete the corresponding management information in the management table 1141 and the log information stored in the log storage portion 1142, and then terminates the MFP log management processing.

By doing this, the administrator operates the PC 2 to transmit the approval information to the management server 5 to perform the approval operation, and in this way, the log information from the PC 2, which is connected to the external network INT and in which the error occurs, can be transmitted to the management server 5.

As described above, according to the present embodiment, in response to the request for transmitting the log information for a specific software program to be executed by a specific PC 2 among the plurality of PCs 2 from the management server 5, since the MFP 1 approves the transmission of the log information for the specific software program, the log information for the software program can be acquired while ensuring the security without transmitting the authentication information to each PC 2.

In the MFP 1, the management information transmitted as the request for transmitting the log information for a specific software program from the management server 5 is registered in the management table 1141 in the NVM 114; the management information at least includes the output program identifier for identifying the specific software program to be executed by the PC 2 and the approval flag indicating whether or not the approval is made; and, for example, if OK is set in the approval flag in response to the approval operation for the transmission of the log information performed through the operation panel 14, the PC 2 can easily determine whether or not the software program therein is a target for which the log information is output and whether or not the output is approved.

According to the present embodiment, in the log information acquisition system including the plurality of PCs 2, the MFP 1 connected to the plurality of PCs 2, and the management server 5 connected to the MFP 1 via the external network INT and configured to request the MFP 1 to transmit the log information for the software program at the time the error occurs in any one of the software programs to be executed by the PC 2 and store the received log information, since the MFP 1 approves the transmission of the log information for the specific software program in response to the request for transmitting the log information for the specific software program to be executed by the specific PC 2 from the management server 5, and the PC 2 outputs the log information when the approval is made by the MFP 1, the management server 5 can acquire the log information for the software program while ensuring the security without transmitting the authentication information to each PC 2.

In the MFP 1, the management information transmitted as the request for transmitting the log information for a specific software program from the management server 5 is registered in the management table 1141 in the NVM 114; the management information at least includes the output program identifier for identifying the specific software program to be executed by the PC 2 and the approval flag indicating whether or not the approval is made; and, for example, if OK is set in the approval flag in response to the approval operation for the transmission of the log information performed through the operation panel 14, since the PC 2 periodically confirms the management information registered in the MFP 1 and collects and outputs the log information when the management information includes the output program identifier for identifying the software program of the PC 2 and OK is set in the corresponding approval flag, the PC 2 can easily determine whether or not the software program therein is a target for which the log information is output and whether or not the output is approved.

Furthermore, the MFP 1 receives the log information output from the PC 2, stores the received log information in the log storage portion 1142 of the NVM 114, and transmits the stored log information to the management server 5 via the external network INT, and in this way, he management server 5 can easily collect and store the log information.

The present invention is not limited to the embodiments described above.

For example, the output flag and the approval flag are simultaneously set to ON or OFF; however, the both may be individually set to ON or OFF. For example, the log information is not output if the output flag keeps OFF even when the approval flag is ON, and in this way, it is possible to control the output timing of the log information using the output flag.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. An image forming apparatus comprising:
a communication processor configured to communicate with a plurality of devices, each of the plurality of devices configured to send an image forming request for an image forming job and log information of at least one executed software program to an image forming apparatus;
an external communication processor configured to communicate with a management server; and
an approval processor configured to approve transmission of log information relating to a target software program among the at least one executed software program in a target device among the plurality of devices, wherein the communication processor receives the log information transmitted from the target device after approval of transmission of the log information, and transmits the received log information to the management server.

2. The image forming apparatus of claim 1, wherein:
the approval processor comprises:
a registration processor configured to receive management information and register the management information as the request; and
an operation processor configured to receive an operation for approving transmission of the log information for the target software program;
the management information comprises an identifier for identifying the target software program and an approval flag indicating whether approval is made; and
the approval processor further comprises an update processor configured to set the approval flag to OK in response to the approval flag indicating that approval is made.

3. A log information acquisition system comprising:
a plurality of devices, each of the plurality of devices configured to send an image forming request for an image forming job and log information of at least one executed software program;
an image forming apparatus connected to each of the plurality of devices and configured to receive the image forming request for an image forming job and the log information from each of the plurality of devices, the image forming apparatus configured to form an image according to the image forming job; and
a management server connected to the image forming apparatus via a network and configured to request the image forming apparatus to transmit log information relating to a target software program among the at least one executed software program in a target device among the plurality of devices to the management server in response to detecting an error in any of the at least one executed software program and store the log information received from the image forming apparatus;
wherein the image forming apparatus comprises an approval processor configured to approve transmission of the log information relating to the target software program in response to receiving the request to transmit the log information for the target software program from the management server; and
wherein the target device is configured to output the log information, after approval is made by the image forming apparatus, to the image forming apparatus.

4. The log information acquisition system of claim 3, wherein:
the approval processor comprises a registration processor configured to register management information received as a request for transmitting the log information for the target software program from the management server, and an operation processor configured to receive an operation for approving transmission of the log information for the target software program;
the management information at least includes an identifier for identifying the target software program and an approval flag indicating whether approval is made;
the approval processor further comprises an update processor configured to set the approval flag to OK in response to receiving the operation for approving transmission of the log information; and
the plurality of devices each periodically confirms the management information registered in the image forming apparatus, and collects and outputs the log information when the management information includes an identifier for identifying the target software program and OK is set in the corresponding approval flag.

5. The log information acquisition system of claim 4, wherein:
the image forming apparatus further comprises a storage processor configured to receive and store the log information output from the plurality of devices; and
a transmission processor configured to transmit the stored log information to the management server via the network.

6. A system comprising:
a device having a processor configured to send an image forming request for an image forming job and log information of at least one executed software program;
a management server; and
an image forming apparatus communicable with the device and the management server, the image forming apparatus, including an approval processor configured to approve transmission of the log information relating to a target software program among the at least one executed software program in the device, the image forming apparatus configured to transmit the log information to the management server if approved by the approval processor.

7. The system of claim 6, wherein:
the management server is configured to transmit management information to the image forming apparatus; and
in response to receiving the management information from the management server, the image forming apparatus is configured to register the management information as a request.

8. The system of claim 7, wherein the management information comprises an identifier for identifying the software program.

9. The system of claim 7, wherein:
the management server is configured to detect an error in the software program and transmit a request to the image forming apparatus in response to detecting the error; and the image forming apparatus is configured to receive the request, determine if the request is approved, and transmit the log information to the management server in response to determining that the request is approved.

10. The system of claim 9, wherein:

the image forming apparatus is configured to transmit a log information request to the device in response to determining that the request is approved; and the device is configured to transmit the log information to the image forming apparatus in response to receiving the log information request from the image forming apparatus.

11. The system of claim 7, wherein:

the device is configured to periodically transmit a management information request to the image forming apparatus;

the image forming apparatus is configured to transmit the management information to the device in response to receiving the management information request;

the device is configured to determine if the management information includes an identifier associated with the software program; and the device is configured to transmit the log information to the image forming apparatus in response to determining that the identifier is associated with the software program.

* * * * *